United States Patent
Fandli (10) Patent No.: US 11,095,611 B2
(45) Date of Patent: Aug. 17, 2021

(54) TRAFFIC VISIBILITY AND SEGMENTATION POLICY ENFORCEMENT FOR WORKLOADS IN DIFFERENT ADDRESS SPACES

(71) Applicant: Illumio, Inc., Sunnyvale, CA (US)

(72) Inventor: Juraj George Fandli, Campbell, CA (US)

(73) Assignee: Illumio, Inc., Sunnyvale, CA (US)

( * ) Notice: Subject to any disclaimer, the term of this patent is extended or adjusted under 35 U.S.C. 154(b) by 293 days.

(21) Appl. No.: 16/149,111

(22) Filed: Oct. 1, 2018

(65) Prior Publication Data

US 2020/0106741 A1    Apr. 2, 2020

(51) Int. Cl.
*H04L 29/06*   (2006.01)
*H04L 12/24*   (2006.01)
*H04L 29/08*   (2006.01)
*H04L 12/26*   (2006.01)

(52) U.S. Cl.
CPC ...... *H04L 63/0236* (2013.01); *H04L 41/0816* (2013.01); *H04L 41/0866* (2013.01); *H04L 41/0893* (2013.01); *H04L 43/045* (2013.01); *H04L 63/20* (2013.01); *H04L 67/1002* (2013.01)

(58) Field of Classification Search
CPC . H04L 63/0236; H04L 63/20; H04L 41/0866; H04L 41/0893; H04L 43/045
USPC ............................................................ 726/1
See application file for complete search history.

(56) References Cited

U.S. PATENT DOCUMENTS

| | | | |
|---|---|---|---|
| 7,072,933 B1 * | 7/2006 | Lamb ................ | H04L 29/12518 709/203 |
| 2014/0310408 A1 | 10/2014 | Kirner et al. | |
| 2015/0128212 A1 | 5/2015 | Scott et al. | |
| 2016/0294646 A1 * | 10/2016 | Kirner ..................... | H04L 43/10 |
| 2017/0264493 A1 * | 9/2017 | Cencini .................. | G06F 1/189 |
| 2018/0176252 A1 * | 6/2018 | Nimmagadda ..... | H04L 41/0893 |
| 2019/0166003 A1 * | 5/2019 | Shelke .................. | H04L 41/046 |

OTHER PUBLICATIONS

Oltsik, "The Case for Host-based Micro-segmentation," Illumio, White Paper, May 2018, pp. 1-9.
PCT International Search Report and Written Opinion, PCT Application No. PCT/US2019/052299, dated Jan. 15, 2020, 29 pages.
PCT Invitation to Pay Additional Fees and, Where Applicable, Protest Fee, PCT Application No. PCT/US2019/052299, dated Nov. 4, 2019, 2 pages.

* cited by examiner

*Primary Examiner* — Evans Desrosiers
(74) *Attorney, Agent, or Firm* — Fenwick & West LLP (57) ABSTRACT

A segmentation server generates and distributes management instructions for enforcing a segmentation policy. The segmentation server discovers a network configuration of workloads including an identification of workloads that are behind network address translation modules. The segmentation server generates management instructions for enforcing the rules in a manner dependent on the detected network configuration. Furthermore, the segmentation server monitors traffic flows and generates a traffic flow graph in a manner dependent on the detected network configuration.

17 Claims, 7 Drawing Sheets

TRAFFIC VISIBILITY AND SEGMENTATION POLICY ENFORCEMENT FOR WORKLOADS IN DIFFERENT ADDRESS SPACES

BACKGROUND

Technical Field

This application relates to monitoring traffic flows and enforcing a segmentation policy in a segmented network environment.

Description of Related Art

A segmentation policy comprises a set of rules that control which workloads may communicate on a network and may place restrictions on how such workloads may communicate. To enforce the segmentation policy, distributed firewalls executing on hosts receive management instructions for enforcing respective rules of the segmentation policy. Traditionally, the firewalls use IP address to identify the workloads for the purpose of enforcing the rules and monitoring traffic flows. However, enforcement and visibility using IP addresses becomes challenging when workloads operate in different address spaces and when the IP addresses are subject to modification via network address translation by a routing device. This problem is especially prevalent in container environments, where the containers running on hosts use IP addresses in different address spaces from their respective host.

SUMMARY

A system, non-transitory computer-readable storage medium, and method generates management instructions for enforcing a segmentation policy. A segmentation server discovers a network configuration in which a first host executes a first workload and a second host executes a second workload. The segmentation server furthermore identifies a network configuration in which the first host performs network address translation between a workload network address space and a host network address space to translate a first workload network address of the first workload to a first host network address of the first host. The segmentation server obtains a segmentation policy and identifies a rule permitting a connection of the first workload to the second workload. Based on the rule and the network configuration, the segmentation server generates a first management instruction for the first workload to cause a first firewall executing on the first host to permit an outbound connection from the first workload network address to a second workload network address of the second workload. Furthermore, based on the rule and the network configuration, the segmentation server generates a second management instruction for the second workload to cause a second firewall executing on the second host to permit an inbound connection from the first host network address of the first host to the second workload network address. The segmentation server sends the first management instruction to the first host to control the first firewall to enforce the first management instruction and sends the second management instruction to the second host to control the second firewall to enforce the second management instruction.

In an embodiment, the segmentation server furthermore receives from the first host, first traffic flow information specifying the outbound connection from the first workload network address of the first workload to the second workload network address of the second workload. The segmentation server also receives from the second host, second traffic flow information specifying the inbound connection to the second workload network address of the second workload from the first host network address of the first host. The segmentation server determines to discard the second traffic flow information responsive to identifying, based on the discovered network configuration, that the first host performs the network address translation. The segmentation server then stores the first traffic flow information.

In an embodiment, the segmentation server generates a traffic flow graph that represents the first workload and the second workload as respective nodes and that represents the outbound connection from the first workload to the second workload as a directed edge between the respective nodes, and provides the traffic flow graph to a client device for display.

In an embodiment, the segmentation server furthermore updates the segmentation policy based on the first traffic flow information. For example, the segmentation server obtains additional traffic flow information from additional hosts in an administrative domain, combines the additional traffic flow information and the first traffic flow information to generate combined traffic flow information associated with the administrative domain, and generates one or more additional rules forbidding communications inconsistent with the combined traffic flow information.

In an embodiment, discovering the network configuration comprises querying a container orchestrator for container information, and obtaining, from the container orchestrator, information identifying the first workload as a container being managed by the container orchestrator, information identifying the first workload network address space, and information indicating that the first host performs the network address translation from the first workload network address space to the first host network address space.

In another embodiment, discovering the network configuration comprises querying an administrative interface of a cloud provider for workload information, and obtaining, from the administrative interface, information identifying the first workload as a cloud workload being managed by the cloud provider, information identifying the first workload network address space, and information indicating that the first host performs the network address translation from the first workload network address space to the first host network address space.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server generates and distributes management instructions for enforcing a segmentation policy. The segmentation server discovers a network configuration of workloads including an identification of workloads that are behind network address translation modules. The segmentation server obtains a segmentation policy and identifies a rule pertaining to an outbound connection from a workload behind a NAT module on a first host to a second workload on a second host. The segmentation server generates a pair of asymmetric management instructions for enforcing the rule in which a first management instruction for enforcement by the first host identifies the workload behind the NAT module using its private network address and a second management instruction for enforcement by the second host identifies the workload behind the NAT module using the host network address. The segmentation server furthermore monitors traffic flows pertaining to connections between the workloads. For traffic flows between a pair of workloads in different network address spaces, the segmentation server stores only traffic flow information for outbound connections from the workload behind the NAT module and discards traffic flow information for inbound connections from the workload behind the NAT module. The monitored traffic flow may be used to generate a traffic flow graph to provide visual feedback to a network administrator and to automatically update the segmentation server to provide improved security.

Figure 1:
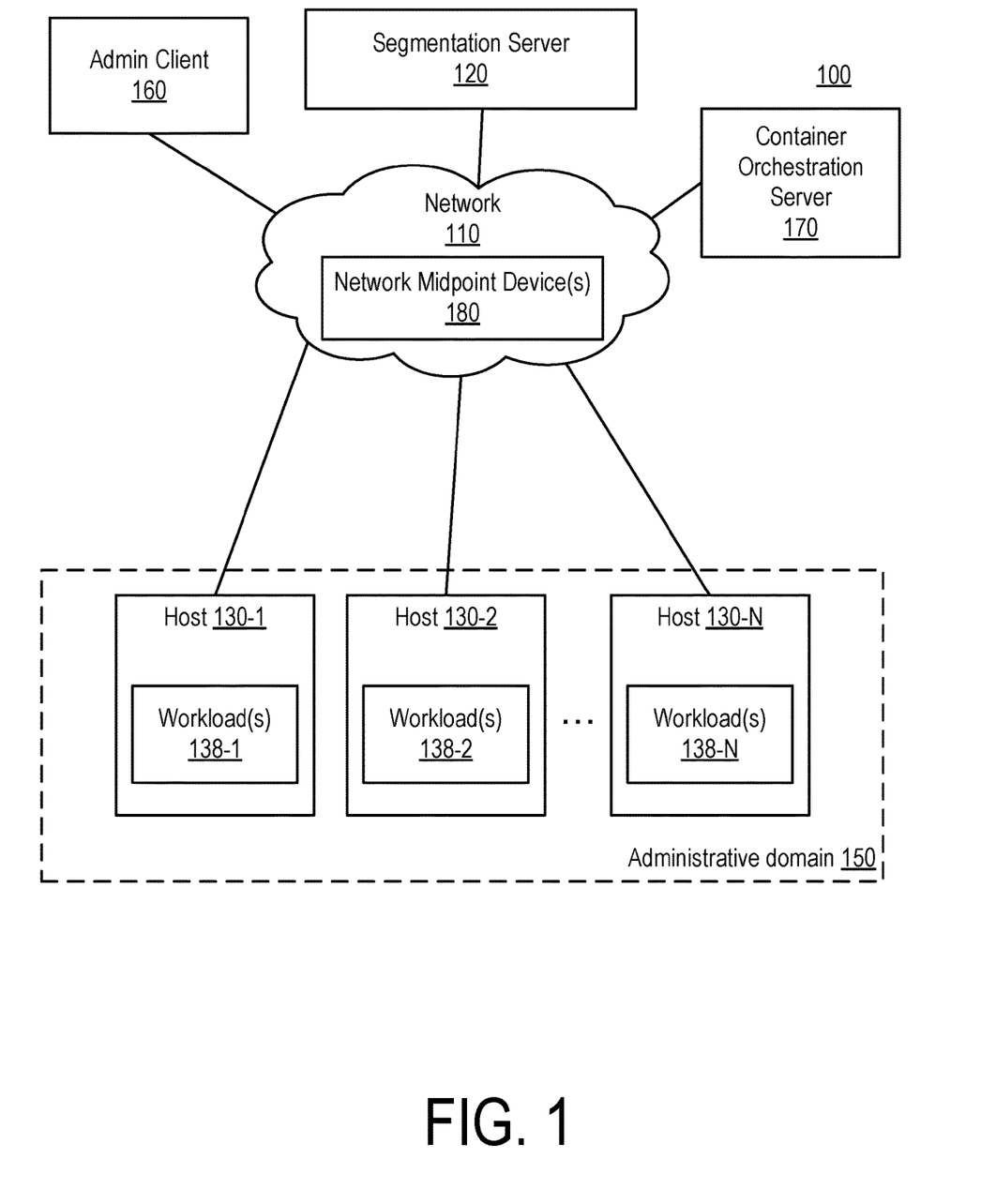
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, a container orchestration server 170, and an administrative domain 150 that includes a plurality of hosts 130 (e.g., hosts 130-1, 130-2, . . . , 130-N). The administrative domain 150 can correspond to an enterprise such as, for example, a service provider, a corporation, a university, or a government agency under control of the segmentation server 120.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the host 130. In some instances, a host 130 may operate only a single workload 138. In other instances, a host 130 may operate multiple workloads 138 (e.g., multiple containers) that may be independently addressable and may perform different independent computing functions. The workloads 138 on the hosts 130 may communicate with other workloads 138 on different hosts 130 within the administrative domain 150 to perform various tasks.

A host 130 may perform network address translation between a workload network address space of one or more workloads 138 executing on the host 130 and the host network address. Thus, workloads 138 external to the host 130 may see only the host network address of the host 130 and may not have visibility into the private network address of the workload 138 in the workload network address space. For example, when a workload 138 is embodied a container, the host 130 typically performs network address translation between a container network address space that includes private network addresses of the containers, and a public network address of the host 130. In other cases, a host 130 may comprise one or more cloud servers operated by a cloud provider that assigns private network addresses to the workloads 138 and performs network address translation between a public network address of associated with the cloud provider and the private network address space of the workloads 138.

The network 110 represents the communication pathways between the segmentation server 120, the administrative client 160, the container orchestration server 170, and the hosts 130. In one embodiment, the network 110 uses standard communications technologies and/or protocols and can include the Internet. In another embodiment, the entities on the network 110 can use custom and/or dedicated data communications technologies. The network 110 includes one or more network midpoint devices 180 that facilitate communications over the network 110. The network midpoint devices 180 may include, for example, routers, switches, access points, firewall devices, or other devices that control communications between the workloads 138 over the network 110. A network midpoint device 180 may be utilized to divide the administrative domain 150 into one or more private networks. Here, a plurality of workloads 138 behind a particular network midpoint device 180 may be assigned private network addresses in a private address space associated with the private network. The network midpoint device 180 performs network address translation to translate between the private network addresses of workloads 138 in the private network and a public network address of the network midpoint device 180. Here, the private network addresses of the workloads 138 in the private network are not visible to workloads 138 outside the private network and the workloads 138 outside the private network see only the public network address of the network midpoint device 180.

The segmentation server 120 is a computer (or set of computers) that obtains and stores information about the hosts 130 on the network 110 and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). A given rule may comprise an inbound rule or an outbound rule. An inbound rule for a particular workload 138 allows the particular workload 138 to accept inbound connections from specified other workloads 138 and permits the particular workload 138 to communicate with the specified other workloads bidirectionally over established connections. An outbound rule for a particular workload 138 allows the particular workload to send outbound connection requests to specified other workloads 138 and allows the particular workload 138 to communicate with the specified other workloads bidirectionally over established connections. Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store workload identifiers that identify the workloads 138, and membership information indicating one or more groups of workloads 138 to which each workload 138 belong (e.g., as defined by the respective label sets for the workloads 138).

Table 2 illustrates an example of information stored by the segmentation server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
| --- | --- |
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced in a distributed manner by at least a subset of the hosts 130. To enable enforcement of the segmentation policy, the segmentation server 120 generates a set of management instructions and distributes the management instructions to the hosts 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different hosts 130 so that each host 130 gets only the management instructions relevant to its operation. Here, the segmentation server 120 may determine which rules are relevant to a given host 130 and distribute the relevant rules to that host 130. A rule may be deemed relevant to a particular host 130 if that host 130 executes one or more workloads 138 that belongs to a group (defined by one or more label sets) referenced by the rule. The segmentation server 120 may furthermore determine which membership information is relevant to each host 130 and distribute the relevant membership information to each respective host 130. Here, membership information may be relevant to a particular host 130 if it defines membership of a group referenced by a rule deemed relevant to the particular host 130.

In an embodiment, the segmentation server 120 automatically generates or updates a segmentation policy based on monitored traffic flows between the workloads 138. For example, the segmentation server 120 may observe which workloads 138 communicate with each other under a very permissive segmentation strategy and the manner in which they communicate under normal conditions. The segmentation server 120 may then automatically generate a more restrictive segmentation policy that limits communications to those consistent with the observed communications. In this manner, anomalous communications that may be indicative of malicious behavior may be blocked. In other embodiments, the segmentation server 120 may generate the segmentation policy based on monitored traffic flows according to different segmentation strategies. The segmentation server 120 may furthermore generate a traffic flow graph comprising a graphical representation of the traffic flows between workloads 138. The traffic flow graph may be useful to enable a network administrator to better understand how the workloads 138 interoperate and may enable the administrator to create an improved segmentation policy or an improved strategy for automatically generated the segmentation policy.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows between the workloads 138.

The container orchestration server 170 manages containers that may execute as workloads 138 on the hosts 130 in the administrative domain 150. The container orchestration server 170 may store various metadata relating to operation of the containers. For example, the container orchestration server 170 may store identifying information for containers that are present in the administrative domain 150 and a network configuration associated with the containers. The network configuration may indicate a network address space associated with each container and an indication of whether the network address space is a private network address that is translated to a public network address by the host 130. An example of a container orchestration server 170 may comprise for example, KUBERNETES or DOCKER ENTERPRISE EDITION.

Figure 2:
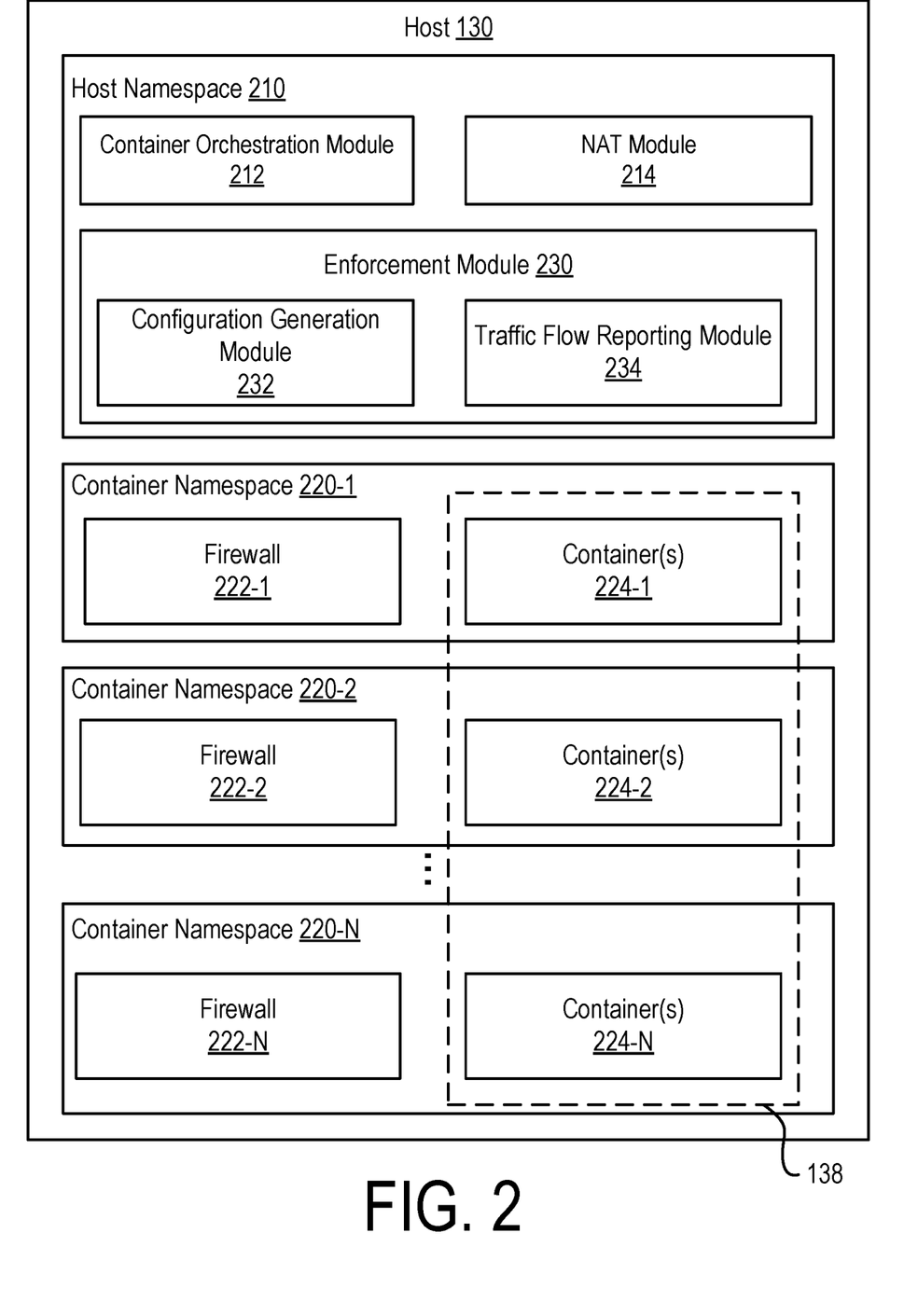
FIG. 2 is a block diagram illustrating an example embodiment of a host executing workloads as containers.

FIG. 2 illustrates an example embodiment of a host 130. The host 130 is organized into multiple namespaces including a host namespace 210 and one or more container namespaces 220. A namespace comprises an abstraction of global system resources that causes a global system resource to appear to processes within a namespace as if the processes in the namespace have access to an isolated instance of the global system resource. Changes to a global system resource by a process in a namespace are visible to other processes within the namespace but are invisible to processes outside the namespace. The host 130 separately manages processes or objects in different namespaces to avoid naming collisions. Thus, processes with the same namespace may operate concurrently in different namespaces. In an embodiment, the host namespace 210 comprises a primary network namespace for processes associated with system level functions of the host 130. Thus, non-containerized processes of the host 130 generally operate in the host namespace 210. One or more workloads 138 (not shown) can also optionally operate in the host namespace 210.

A container namespace 220 is a network namespace associated with one or more containers 224. One or more containers 224 may execute in each of the respective container namespaces 220. Here, a container 224 is a set of processes executing within a user space of a container namespace 220 that is shared with the kernel of the host 130 (i.e., the container 224 does not have a separate kernel). A container 224 may be defined by a combination of its kernel features, control groups, and its namespace. The container namespaces 220 referenced herein may refer to network namespaces on LINUX operating systems or compartments on WINDOWS operating systems. Containers 224 are useful to provide isolation between different virtual hosting environments executing on the same host 130. For example, the processes associated with a first container 224-1 in the first container namespace 220-1 have visibility only into the resources within the first container namespace 220-1 and are isolated from resources outside the first container namespace 220-1. Thus, a first container 224-1 does not have visibility into resources associated with the container namespaces 220-2, . . . , 220-N. In an administrative domain 150, containers 224 may be utilized to provide isolation between different types of applications. For example, a first container 224-1 may execute processes associated with database applications and a second container 224-2 may execute processes associated with web applications. An example of a container 224 may comprise, for example, DOCKER or CONTAINERD. The one more containers 224 represent specific types of the workloads 138 managed by the segmentation policy as described above. Thus, a container 224 may respectively be assigned labels and may be controlled by rules of the segmentation policy as described above.

The firewalls 222 each comprise a low-level network firewall or security engine that controls and monitors incoming and outgoing traffic associated with a respective container 224 executing in the container namespace 220 of the host 130. A firewall 222 operates to filter incoming and outgoing packets to the container 224 based on a table specifying packets that should be blocked or permitted based on a source and/or destination identifier associated with a packet (e.g., network addresses). Thus, the firewall 222 in a particular container namespace 220 operates to restrict communications to or from a container 224 in the particular container namespace 220. For example, a firewall 222 may permit a particular container 224 in the associated container namespace 220 to communicate with a limited set of workloads 138 on other hosts 130, and may block other communications. Furthermore, the firewall 222 may place restrictions on how a container 224 in the associated container namespace 220 is permitted to communicate. Thus, for a container 224, the associated firewall 222 may enable the container 224 to communicate using only encrypted protocols and block any unencrypted communications.

The firewall 222 may furthermore be configured to each provide traffic flow information to the traffic flow reporting module 234 describing traffic flow to and from the respective associated containers 224. For example, a firewall 222 may be configured with a firewall rule that causes the firewall 222 to report all traffic flow through the firewall 222. In an embodiment, the traffic flow information reported from the firewall 222 for a particular connection may include, for example, a source identifier identifying a source address (e.g., source network address) of the connection, a destination identifier identifying a destination address (e.g., destination network address) of the connection, ports associated with the connection used by the source and destination workloads 138, and a protocol associated with the connection. The traffic flow information may furthermore include a direction of the connection (e.g., outbound from workload A and inbound to workload B). The information may be derived, for example, from header data included in packets of the communications.

In an embodiment, the firewalls 222 may each comprise an operating system-level firewall such as a Linux kernel firewall based on Netfilter modules or a Windows firewall based on a Windows Filtering Platform. Furthermore, the firewalls 222 may comprise an Internet Protocol security (IPsec) engine that controls encryption and decryption of packets sent to and from the respective container 224. In an embodiment, the firewalls 222 each operate in the kernel space of the host 130.

Various system modules execute in the host namespace 210 include a container orchestration module 212, a NAT module 214, and an enforcement module 230 including a configuration generation module 232 and a traffic flow reporting module 234. The configuration generation module 232 receives the management instructions from the segmentation server 120 and translates the management instructions from a high level set of instructions to a low level configuration of the firewalls 222. For example, the configuration generation module 232 obtains the relevant rules and relevant membership information in the received management instructions and identifies the specific containers 224 referenced by the label sets specified in the rules. The configuration generation module 232 then configures the firewalls 222 to control traffic to and from the containers 224 to enforce the management instructions. In an embodiment, the configuration generation module 232 includes an iptables executable that executes to program respective filtering tables of the firewalls 222.

The configuration generation module 232 may furthermore configure the firewalls 222 to report traffic flow information relating to traffic flows to and from the containers 224 to the traffic flow reporting module 234. The traffic flow reporting module 234 obtains traffic information from each of the firewalls 222 indicating traffic to and from each of the containers 224. The traffic flow reporting module 234 reports the detected traffic to the segmentation server 120.

The container orchestration module 212 manages the containers 224 on the host 130. The container orchestration module 212 may create new containers 224, remove containers 224, or modify operating characteristics of existing containers 224 in response to instructions from the container orchestration server 170. When creating a new container 224, the container orchestration agent 212 obtains a container profile from the container orchestration server 170 that includes information for configuring the container 224 and may include a network address space associated with the container 224. Examples of container orchestration agent 212 include DOCKER or CONTAINERD.

The network address translation (NAT) module 214 performs network address translation between container network addresses for the containers 224 in a container network address space and a public network address of the host 130 in a host network address space. The container network address space may comprise private network addresses that are not visible to other workloads 138 on the network 110 external to the host 130. The host network address space may comprise public network addresses that are visible to other workloads 138 on the network 110. Thus, a remote workload 138 has visibility only to the host network address of the host 130 and does not have visibility to the container network address of the container 224.

Figure 3:
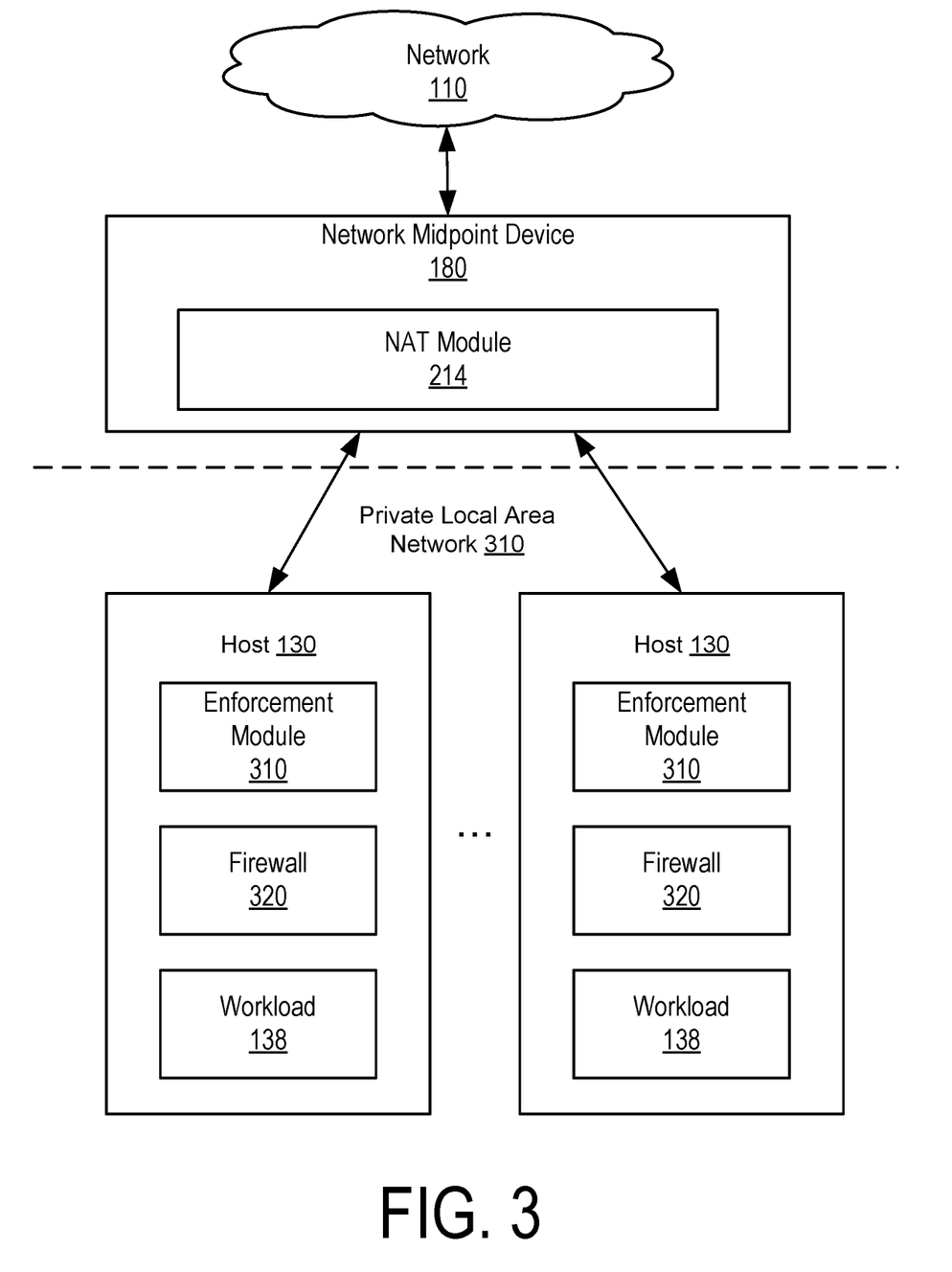
FIG. 3 is a block diagram illustrating an example embodiment of a host that does not execute containers.

FIG. 3 illustrates another embodiment in which the NAT module 214 instead operates in a network midpoint device 180 controlling traffic to and from one or more hosts 130 that respectively executes one or more workloads 138 that are not necessarily embodied as containers 224. In this embodiment, the hosts 130 may each comprise an enforcement module 310, a firewall 320, and one or more workloads 138. The enforcement module 310 may operate similarly to the enforcement module 230 described above to receive management instructions associated with the one or more workloads 138 executing on the host 130 and configure the firewall 320 to control traffic to and from the workloads 138 in accordance with the rules. The firewall 320 may operate similarly to the firewalls 222 described above to control traffic to and from the workloads 138 and to report traffic through the firewall 320 in accordance with the rules.

In this example, the hosts 130 may comprise, for example, cloud servers operated by a cloud service provider behind the network midpoint device 180. The NAT module 214 operates to create a private local area network 310 behind the network midpoint device 180. Particularly, the NAT module 214 performs network address translation between workload network addresses for the workloads 138 in a workload network address space and a public network address of the network midpoint device 180 in a public network address space. The workload network address space may comprise private network addresses that are not visible to other remote workloads 138 on the network 110 that are not behind the network midpoint device 180. Thus, from the perspective of a remote workload 138 outside the private local area network 310, communications coming from a workload 138 behind the NAT module 214 in the private local area network 310 include the public network address of the network midpoint device 180 and not the private workload network address of the workload 138.

The network environment 100 of FIG. 1 may include a combination of hosts 130 executing workloads 138 as container 224 (such as in FIG. 2) and hosts 130 executing workloads 138 without containers 224 (such as in FIG. 3). Furthermore, some hosts 130 may be behind network midpoint devices 180 having NAT modules 214 (such as in FIG. 3). Other hosts 130 on the network 110 may not behind NAT modules 214 and workloads 138 executing on them may have network addresses publically visible on the network 110. Here, the public network address of the workload 138 may be the same as the host network address of the host 130. Further still, the network environment 100 of FIG. 1 may include hosts 130 executing one or more workloads 138 that lack an enforcement module 310. In this case, the host 130 does not directly enforce the segmentation policy with respect to the workloads 138 executing on the host 130. Nevertheless, the workloads 138 executing on a host 130 lacking an enforcement module 310 may be affected by the segmentation policy based on firewall rules enforced on other hosts 130.

Figure 4:
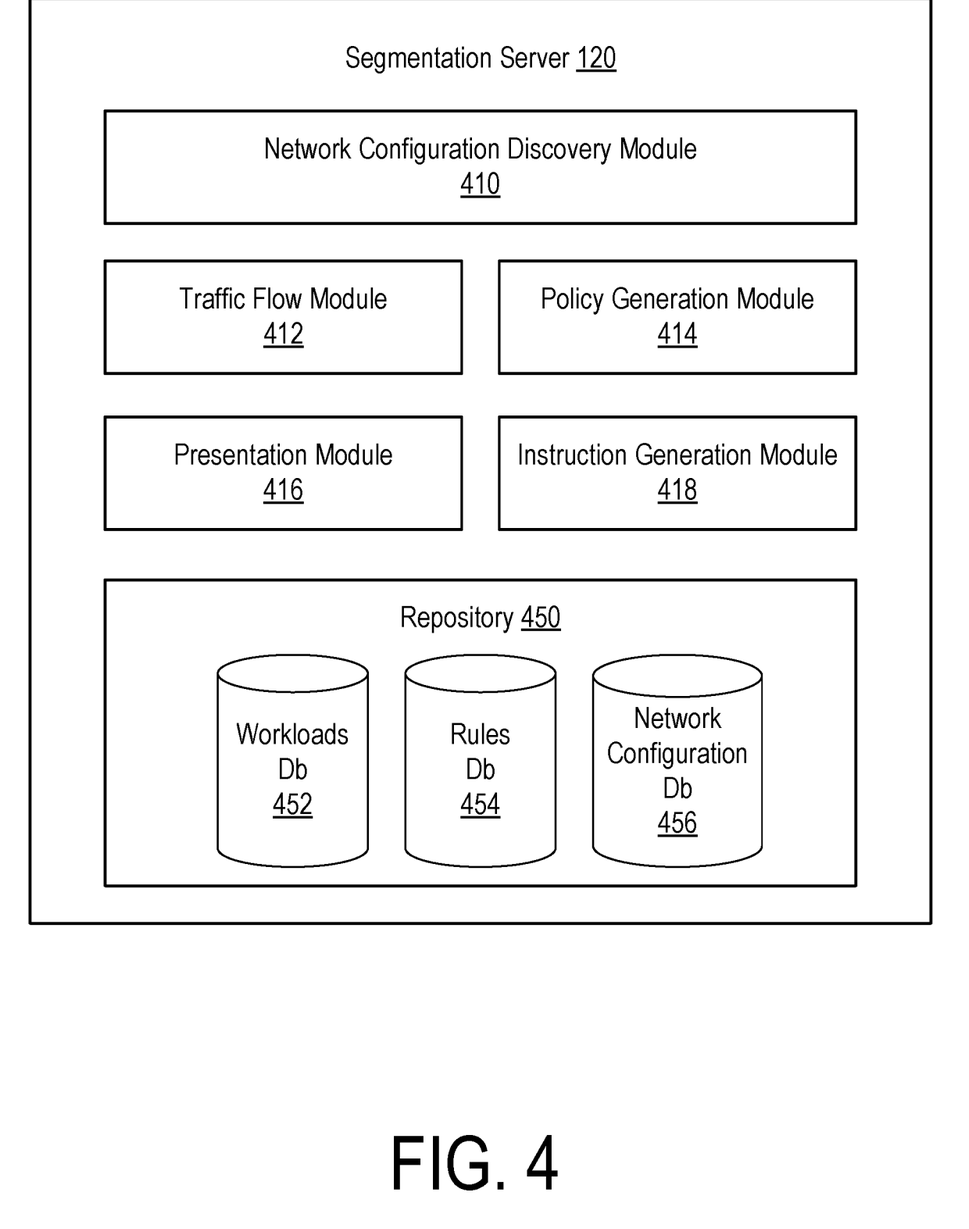
FIG. 4 is a block diagram illustrating an embodiment of a segmentation server.

FIG. 4 is a high-level block diagram of an embodiment of a segmentation server 120. The segmentation server 120 comprises a network configuration discovery module 410, a traffic flow module 412, a rule generation module 414, a presentation module 416, an instruction distribution module 418, and a repository 450. The repository 450 may comprise a workloads database 452 that stores associations between workloads 138 and their respective label sets, a rules database 454 that stores a segmentation policy as a set of rules, and a network configuration database 456 that stores information about the network configuration associated with the workloads 138. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The network configuration discovery module 410 discovers a network configuration pertaining to the workloads 138 in the administrative domain 150. The network configuration includes an identification of workloads 138 that are assigned a private network address behind a network address translation (NAT) module. For each of the workloads 138 that have a private network address, the network configuration furthermore identifies a network address space in which the private network address is assigned and a public network address (e.g., the network address of the host 130 on which the workload 138 operates) to which the private network address is translated. Furthermore, the network configuration may identify workloads 138 that are not behind a NAT module and the public network addresses associated with these workloads 138 (which may be the same as the network address of the host 130 on which the workload 138 executes).

For example, the network configuration discovery module 410 may query the container orchestration server 170 to discover any workloads 138 that are embodied as containers 224. The network configuration discovery module 410 may obtain from the container orchestration server 170, the network configuration of the containers 224 (e.g., the network address spaces associated with the containers 224 it manages and the host network address to which the host 130 translates the container network address). The network configuration discovery module 410 may furthermore query an administrative service associated with a cloud provider utilized by the administrative domain 150 to identify workloads 138 executing on one hosts 130 operated by the cloud provider. Here, the network configuration discovery module may obtain information indicating whether the hosts 130 or network midpoint devices 180 associated with the cloud provider perform network address translation. The network configuration discovery module 410 may then, obtain the network configuration of the workloads 138 from the administrative service. The network configuration discovery module 410 may furthermore detect private networks behind network midpoint devices 180 that perform network address translation and query an administrative interface associated with the network midpoint device 180 to obtain the network configuration of the workloads 138.

The traffic flow module 412 obtains traffic information relating to traffic flows between workloads 138 and presents the traffic information relating to the traffic flows. For example, the traffic flow module 412 may identify each pair of workloads 138 that communicates with each other during a particular time period. For each detected traffic flow between a pair of workloads 138, the traffic flow module 412 may identify a direction of the connection, what services are communicated between the pair of workloads, what subcomponents of the respective workloads (e.g., specific applications) 138 utilize those services, what ports are used by the respective workloads for the communications, and what protocols are used for the communications. Furthermore, the traffic flow module 412 may identify statistical information relating to the traffic flow between a pair of workloads 138 such as, for example, a volume of data transferred between the pair of workloads within a particular time period, a frequency of communications between the pair of workloads 138, a duration of communications between the pair of workloads 138, or other statistical information indicative of the extent of the communications.

The traffic flow module 412 may generate a representation of the traffic flows in the form of a traffic flow graph in which each workload 138 is represented by a node and a traffic flow between a pair of workloads 138 is represented by an edge connecting the respective nodes corresponding to the pair of workloads 138. The nodes may store information relating to the workloads 138 and the edges may store information relating to the traffic flow including the direction of the connection associated with the traffic flow. In an embodiment, the traffic flow graph may be limited to traffic flows meeting predefined criteria. For example, the traffic flow graph may be limited to traffic flows meeting a predefined threshold volume of the traffic (e.g., amount of data, frequency, duration, or a combination thereof). Thus, pairs of workloads 138 having only very limited or sporadic connections may be omitted from the traffic flow graph.

The traffic flow module 412 may drop traffic flows reported by a local host 130 that pertain to inbound connections from a remote workload 138 that is in a different network address space than the local host 130 (e.g., because the remote workload 138 is behind a NAT module). In this situation, the remote host 130 and the local host 130 report inconsistent network addresses associated with the communication due to the network address translation. Particularly, the remote host 130 will report a connection from the workload network address of the remote workload 138 to a local workload address of a local workload 138 executing on the local host 130. However, the local host 130 will report a connection from the host network address of the remote host 130 (instead of the workload network address of the remote workload 138) because the local host 130 does not have visibility to the workload network address of the remote workload 138. By dropping traffic flows associated with inbound connections from remote workloads 138 detected to be behind a NAT module, the inconsistency can be resolved. In contrast, for traffic flows between two workloads 138 that are not behind NAT modules, the reported traffic flows from the respective hosts 130 will be consistent. Here, the traffic flow module 412 may capture and store both traffic flows.

The rule generation module 414 automatically generates rules. The particular strategy for generating the rules may be based on configuration settings for the rule generation module 314. Under some configuration settings, the rules may be generated based at least in part on the observed traffic flow graph. Particularly, the rule generation module 414 generates a set of rules that permits the traffic flows in the traffic flow graph, without permitting other traffic flows unrelated to the observed traffic flow graph. For example, the rule generation module 414 identifies a traffic flow and identifies the service associated with the traffic flow, the workload 138 corresponding to the provider of the service, and the workload 138 corresponding to the consumer of the service. The rule generation module 414 then generates a rule, if it does not already exist, that permits providing of the service from the identified provider of the service to the identified consumer of the service. The rule may be constructed using the label sets of the identified provider and the identified consumer. For example, if the provider has a first label set A and the consumer has a second label set B, the rule may specify the first label set A in the provided-by portion and the second label set B in the used-by portion of the newly created rule. Rules may be similarly generated for each observed traffic flow in the traffic flow graph and may be stored to the rules database 316. Assuming that there are no abnormal or malicious communications in the administrative domain 150 in the observed traffic flow graph, the rule generation module 414 will therefore produce a set of rules that permits communications observed during normal operation of the workloads 138 in the administrative domain 150 without permitting abnormal communications that are potentially malicious. When the segmentation policy is enforced by the hosts 130, the hosts 130 will block such potentially malicious communications that are not expressly permitted by the rules.

The presentation module 416 interfaces with the administrative client 160 to present a user interface enabling an administrator to manage the administrative domain 150 or a portion thereof. For example, the presentation module 416 may enable an administrator to view a representation of the traffic flows generated by the traffic flow module 412 and generate or modify rules associated with the segmentation policy using the rule generation module 414. For example, the presentation module 416 may generate a graphical interface representing all or a portion of the traffic flow graph with the workloads 138 illustrated as nodes and the traffic flows illustrated as edges connecting relevant nodes. An administrator may select a particular node to view information about the corresponding workload 138 (e.g., an identifier for the workload, a label set for the workload, services provided by or consumed by the workload, etc.). An administrator may similarly select a particular edge on the graph to view information about the corresponding traffic flow such as, for example, services associated with the traffic flow, ports and protocols associated with the traffic flow, or statistical information associated with the traffic flow.

The instruction generation module 418 generates the management instructions from the rules and distributes the relevant management instructions to the hosts 130 as described above. The instruction generation module 418 may generate instructions differently depending on whether or not the rule involves workloads 138 in different network address spaces or the same network address space. For a rule pertaining to workloads 138 in the same network address space, the instruction generation module 418 generates a symmetric pair of management instructions for the workloads 138 (e.g., an inbound management instruction and an outbound management instruction) that each identify the workloads 138 using their respective workload network addresses. However, for rules involving workloads 138 in different network address spaces, the instructions generation module 418 generates an asymmetric pair of management instructions that identifies the workloads 138 differently for the inbound and outbound management instructions. An example embodiment illustrating this asymmetric management instructions generation is illustrated in FIG. 5 below.

Figure 5:
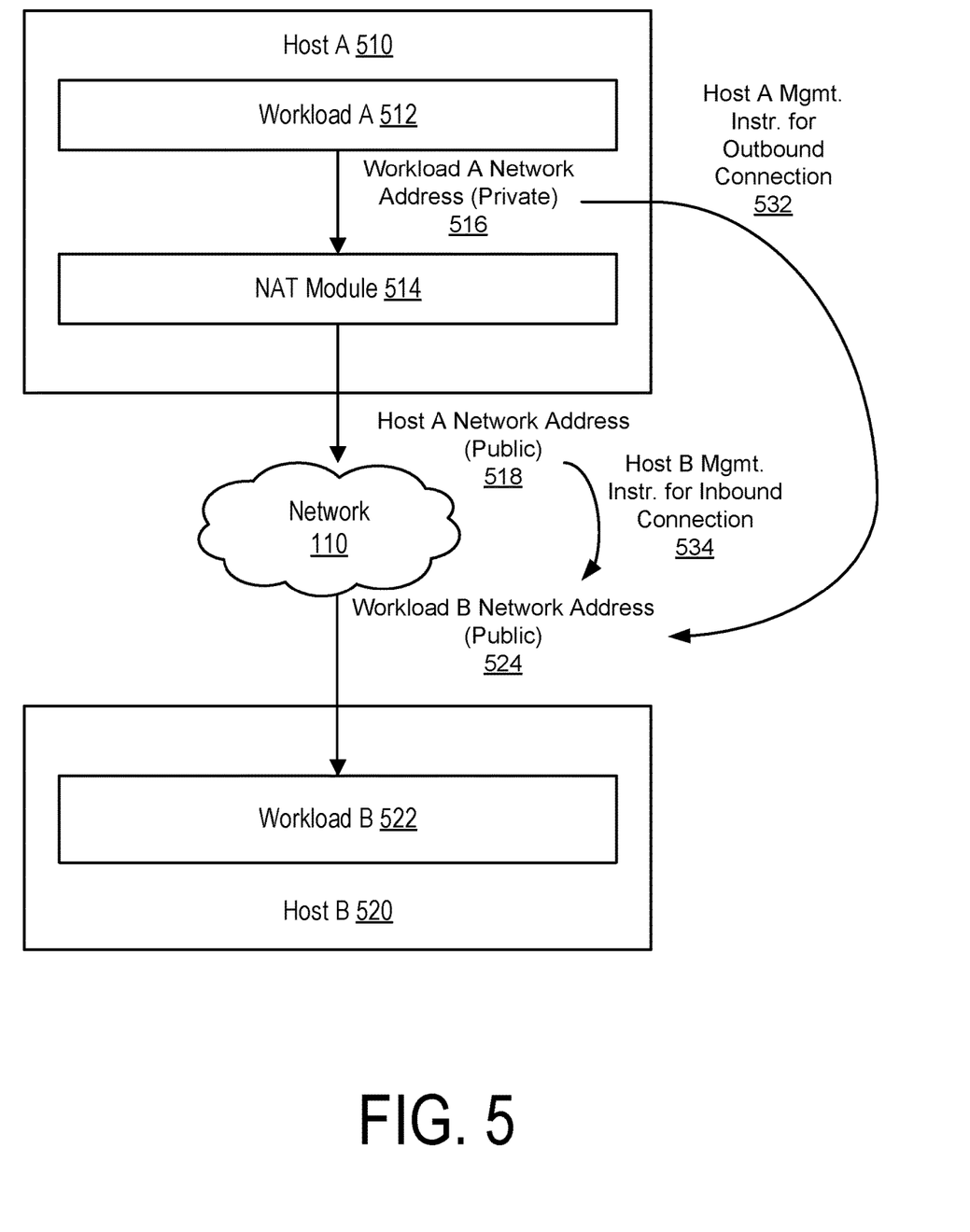
FIG. 5 is a diagram illustrating an example of asymmetric rule generation for workloads operating in different network address spaces.

FIG. 5 illustrates an example of asymmetric management instruction generation when workloads 138 are in different network address spaces. In this example, a workload A 512 executes on a host 510 A and a workload B 522 executes on a host B 520. The host A 510 includes a NAT module 514 that translates between a workload A network address 516 (which is private) and a host A network address 518 (which is public). The host B 520 does not include a NAT module and the workload B network address 524 is a public network address visible to hosts on the network 110. Thus, host A 510 has visibility to the workload A network address 516, while host B only has visibility to the host A network address 518. To enforce a rule permitting a connection from workload A 512 to workload B 522, a pair of asymmetric management instructions are generated for enforcement by the host A 510 and the host B 520 respectively. Particularly, an outbound management instruction 532 to be enforced by host A is generated that permits an outbound connection from the workload A network address 516 to the workload B network address 524. An inbound management instruction 534 to be enforced by the host B 520 is generated that permits an inbound connection from the host A network address 518 to the workload B network address 524.

Figure 6:
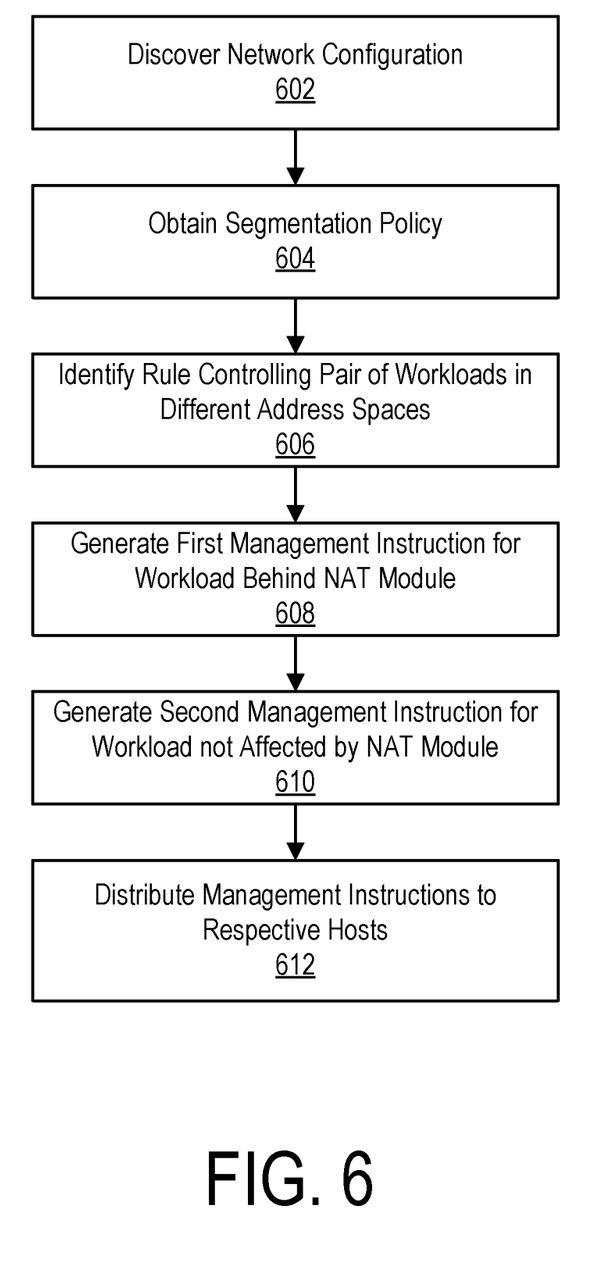
FIG. 6 is a flowchart illustrating an example embodiment of a process for generating and distributes management instructions for workloads executing in different network address spaces.

FIG. 6 illustrates an example embodiment of a process for enforcing a segmentation policy for workloads 138 executing in different network address spaces. The segmentation server 120 discovers 602 the network configuration of a plurality of workloads 138. The network configuration includes an identification of the network address spaces associated with the workloads 138 and a determination of which workloads 138 are behind NAT modules that translates a workload network address of the workload 138 in a private network address space to a public network address (e.g., of the host 130 or an upstream network midpoint device 180). The segmentation server 120 also obtains 604 the segmentation policy comprising a set of rules controlling communications between the workloads 138. The segmentation server 120 identifies a rule that controls communications between a pair of workloads 138 that are in different network address spaces and identifies one of the workloads 138 as being behind a NAT module. For example, the segmentation server 120 may identify a rule that permits an outbound connection from a first workload 138 that is behind a NAT module to a second workload 138. The segmentation server 120 generates 608 a first management instruction for the first workload 138 that is behind the NAT module and generates 610 a second management instruction for the second workload 138 that is not behind a NAT module. The first management instruction permits an outbound connection from a workload network address (which may be a private network address) of the first workload 138 to a second workload network address of the second workload 138 (which may be a public network address). The second management instruction for the second workload 138 on the second host 130 permits an inbound connection from a host network address of the first host 130 to the second workload network address. The segmentation server 120 then distributes 612 the first and second management instructions to the first and second hosts 130 respectively.

Figure 7:
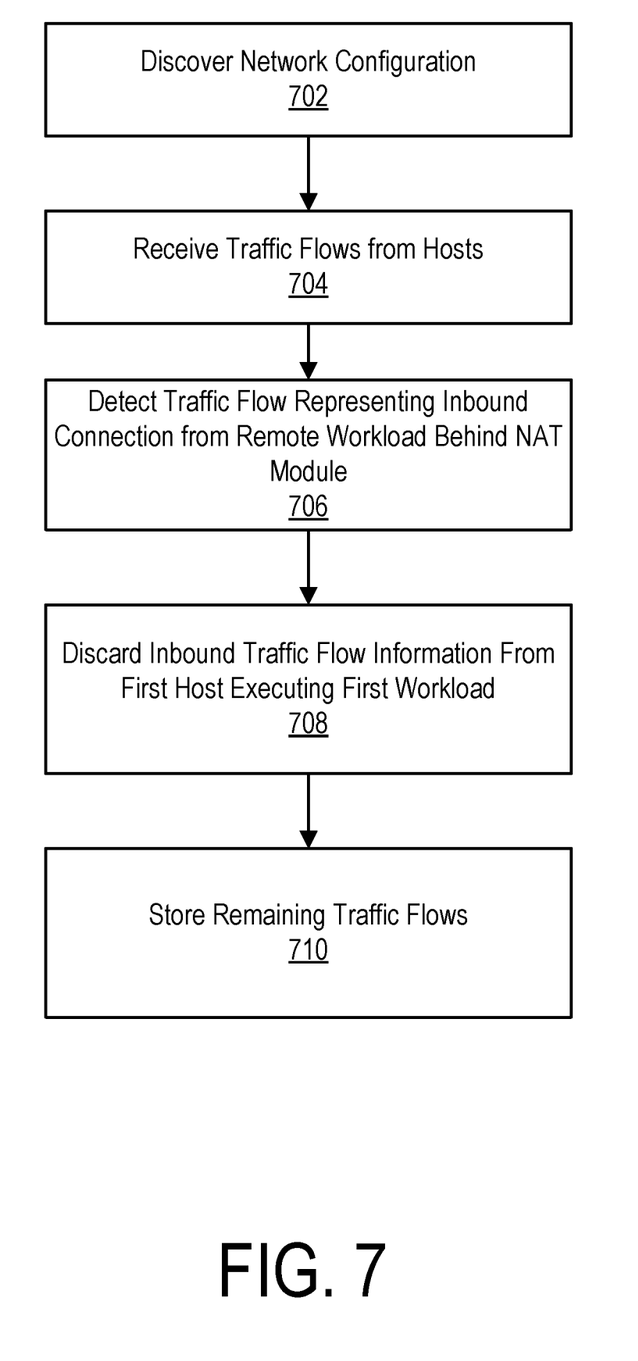
FIG. 7 is a flowchart illustrating an example embodiment of generating traffic flow information relating to communications between workloads executing in different network address spaces.

FIG. 7 illustrates an embodiment of a process for monitoring traffic flows in a segmented network. The segmentation server 120 discovers 702 the network configuration of a plurality of workloads 138 including identifying the network address spaces associated with the workloads 138 and identifying which workloads 138 are behind NAT modules as described above. The segmentation server 120 receives traffic flows from respective hosts 130. The segmentation server 120 detects 706, based on the network configuration and the traffic flows, a particular traffic flow that represents an inbound connection from a remote workload 138 that is behind a NAT module. The segmentation server 120 discards the traffic flow representing the inbound connection from the remote workload 138 that is behind the NAT module. The segmentation server 120 stores 710 the remaining traffic flows. Particularly, the segmentation server 120 may store traffic flows representing outbound connections from workloads 138 that are behind the NAT modules, and may furthermore store traffic flows in both directions between pairs of workloads 138 of which neither are behind NAT modules. The segmentation server 120 may then utilize the stored traffic flows for various application, including generating a presenting traffic flow graphs as described above, and generating or updating the segmentation policy based on the observed traffic flows.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for enforcing a segmentation policy, the method comprising:
   discovering a network configuration in which a first host executes a first workload and a second host executes a second workload;
   discovering in the network configuration that the first host performs network address translation between a workload network address space and a host network address space to translate a first workload network address of the first workload to a first host network address of the first host;
   obtaining a segmentation policy;
   identifying, in the segmentation policy, a rule permitting a connection of the first workload to the second workload;
   generating, based on the rule and the network configuration, a first management instruction for the first workload to cause a first firewall executing on the first host to permit an outbound connection from the first workload network address to a second workload network address of the second workload;
   generating, based on the rule and the network configuration, a second management instruction for the second workload to cause a second firewall executing on the second host to permit an inbound connection from the first host network address of the first host to the second workload network address;
   sending the first management instruction to the first host to control the first firewall to enforce the first management instruction; and
   sending the second management instruction to the second host to control the second firewall to enforce the second management instruction;
   generating a traffic flow graph that represents the first workload and the second workload as respective nodes and that represents the outbound connection from the first workload to the second workload as a directed edge between the respective nodes; and
   outputting the traffic flow graph.

2. The method of claim 1, further comprising:
   receiving from the first host, first traffic flow information specifying the outbound connection from the first workload network address of the first workload to the second workload network address of the second workload;
   receiving, from the second host, second traffic flow information specifying the inbound connection to the second workload network address of the second workload from the first host network address of the first host;
   determining to discard the second traffic flow information responsive to identifying, based on the discovered network configuration, that the first host performs the
network address translation; and
storing the first traffic flow information.

3. The method of claim 2, further comprising:
updating the segmentation policy based on the first traffic flow information.

4. The method of claim 3, wherein updating the segmentation policy comprises:
obtaining additional traffic flow information from additional hosts in an administrative domain;
combining the additional traffic flow information and the first traffic flow information to generate combined traffic flow information associated with the administrative domain; and
generating one or more additional rules forbidding communications inconsistent with the combined traffic flow information.

5. The method of claim 1, wherein discovering the network configuration comprises:
querying a container orchestrator for container information; and
obtaining, from the container orchestrator, information identifying the first workload as a container being managed by the container orchestrator, information identifying the first workload network address space, and information indicating that the first host performs the network address translation from the first workload network address space to the first host network address space.

6. The method of claim 1, wherein discovering the network configuration comprises:
querying an administrative interface of a cloud provider for workload information; and
obtaining, from the administrative interface, information identifying the first workload as a cloud workload being managed by the cloud provider, information identifying the first workload network address space, and information indicating that the first host performs the network address translation from the first workload network address space to the first host network address space.

7. A non-transitory computer-readable storage medium storing instructions for enforcing a segmentation policy, the instructions when executed by a processor cause the processor to perform steps including:
discovering a network configuration in which a first host executes a first workload and a second host executes a second workload;
discovering in the network configuration that the first host performs network address translation between a workload network address space and a host network address space to translate a first workload network address of the first workload to a first host network address of the first host;
obtaining a segmentation policy;
identifying, in the segmentation policy, a rule permitting a connection of the first workload to the second workload;
generating, based on the rule and the network configuration, a first management instruction for the first workload to cause a first firewall executing on the first host to permit an outbound connection from the first workload network address to a second workload network address of the second workload;
generating, based on the rule and the network configuration, a second management instruction for the second workload to cause a second firewall executing on the second host to permit an inbound connection from the first host network address of the first host to the second workload network address;
sending the first management instruction to the first host to control the first firewall to enforce the first management instruction; and
sending the second management instruction to the second host to control the second firewall to enforce the second management instruction;
generating a traffic flow graph that represents the first workload and the second workload as respective nodes and that represents the outbound connection from the first workload to the second workload as a directed edge between the respective nodes; and
outputting the traffic flow graph.

8. The non-transitory computer-readable storage medium of claim 7, the instructions when executed further causing the processor to perform steps including:
receiving from the first host, first traffic flow information specifying the outbound connection from the first workload network address of the first workload to the second workload network address of the second workload;
receiving, from the second host, second traffic flow information specifying the inbound connection to the second workload network address of the second workload from the first host network address of the first host;
determining to discard the second traffic flow information responsive to identifying, based on the discovered network configuration, that the first host performs the network address translation; and
storing the first traffic flow information.

9. The non-transitory computer-readable storage medium of claim 8, the instructions when executed further causing the processor to perform steps including:
updating the segmentation policy based on the first traffic flow information.

10. The non-transitory computer-readable storage medium of claim 9, wherein updating the segmentation policy comprises:
obtaining additional traffic flow information from additional hosts in an administrative domain;
combining the additional traffic flow information and the first traffic flow information to generate combined traffic flow information associated with the administrative domain; and
generating one or more additional rules forbidding communications inconsistent with the combined traffic flow information.

11. The non-transitory computer-readable storage medium of claim 7, wherein discovering the network configuration comprises:
querying a container orchestrator for container information; and
obtaining, from the container orchestrator, information identifying the first workload as a container being managed by the container orchestrator, information identifying the first workload network address space, and information indicating that the first host performs the network address translation from the first workload network address space to the first host network address space.

12. The non-transitory computer-readable storage medium of claim 7, wherein discovering the network configuration comprises:
querying an administrative interface of a cloud provider for workload information; and obtaining, from the administrative interface, information identifying the first workload as a cloud workload being managed by the cloud provider, information identifying the first workload network address space, and information indicating that the first host performs the network address translation from the first workload network address space to the first host network address space.

13. A computer system comprising:
a processor; and
a non-transitory computer-readable storage medium storing instructions for enforcing a segmentation policy, the instructions when executed by the processor cause the processor to perform steps including:
discovering a network configuration in which a first host executes a first workload and a second host executes a second workload;
discovering in the network configuration that the first host performs network address translation between a workload network address space and a host network address space to translate a first workload network address of the first workload to a first host network address of the first host;
obtaining a segmentation policy;
identifying, in the segmentation policy, a rule permitting a connection of the first workload to the second workload;
generating, based on the rule and the network configuration, a first management instruction for the first workload to cause a first firewall executing on the first host to permit an outbound connection from the first workload network address to a second workload network address of the second workload;
generating, based on the rule and the network configuration, a second management instruction for the second workload to cause a second firewall executing on the second host to permit an inbound connection from the first host network address of the first host to the second workload network address;
sending the first management instruction to the first host to control the first firewall to enforce the first management instruction; and
sending the second management instruction to the second host to control the second firewall to enforce the second management instruction;
generating a traffic flow graph that represents the first workload and the second workload as respective nodes and that represents the outbound connection from the first workload to the second workload as a directed edge between the respective nodes; and
outputting the traffic flow graph.

14. The computer system of claim 13, the instructions when executed further causing the processor to perform steps including:
receiving from the first host, first traffic flow information specifying the outbound connection from the first workload network address of the first workload to the second workload network address of the second workload;
receiving, from the second host, second traffic flow information specifying the inbound connection to the second workload network address of the second workload from the first host network address of the first host;
determining to discard the second traffic flow information responsive to identifying, based on the discovered network configuration, that the first host performs the network address translation; and
storing the first traffic flow information.

15. The computer system of claim 14, the instructions when executed further causing the processor to perform steps including:
updating the segmentation policy based on the first traffic flow information.

16. The computer system of claim 15, wherein updating the segmentation policy comprises:
obtaining additional traffic flow information from additional hosts in an administrative domain;
combining the additional traffic flow information and the first traffic flow information to generate combined traffic flow information associated with the administrative domain; and
generating one or more additional rules forbidding communications inconsistent with the combined traffic flow information.

17. A method for generating a segmentation policy comprising:
discovering a network configuration in which a first host is associated with a first host network address in a host network address space, a second host is associated with a second host network address in the host network address space, and a third host is associated with a third host network address in the host network address space;
discovering in the network configuration that the first host executes a container as a first workload and that the first host performs network address translation between a container network address space and the host network address space to translate a container network address of the first workload to the first host network address;
discovering in the network configuration that the second host executes a second workload associated with the second host network address without the second host performing network address translation, and the third host executes a third workload associated with the third host network address without the third host performing network address translation;
receiving from the first host, first traffic flow information specifying an outbound connection from the container network address to the second host network address;
receiving, from the second host, second traffic flow information specifying an inbound connection from the first host network address to the second host network address, and third traffic flow information specifying an outbound connection from the second host network address to the third host network address;
receiving from the third host, fourth traffic flow information specifying an inbound connection from the second host network address to the third host network address;
determining to discard the second traffic flow information responsive to identifying, based on the discovered network configuration, that the first host performs the network address translation from the container network address space to the host network address space;
combining at least the first, third, and fourth traffic flow information to generate combined traffic flow information associated with an administrative domain; and
generating a segmentation policy forbidding communications inconsistent with the combined traffic flow information.

* * * * *